Dec. 4, 1956  L. E. CUTLIP  2,772,595
GAME FOR TEACHING WRITTEN MUSIC
Filed May 21, 1953  2 Sheets-Sheet 1
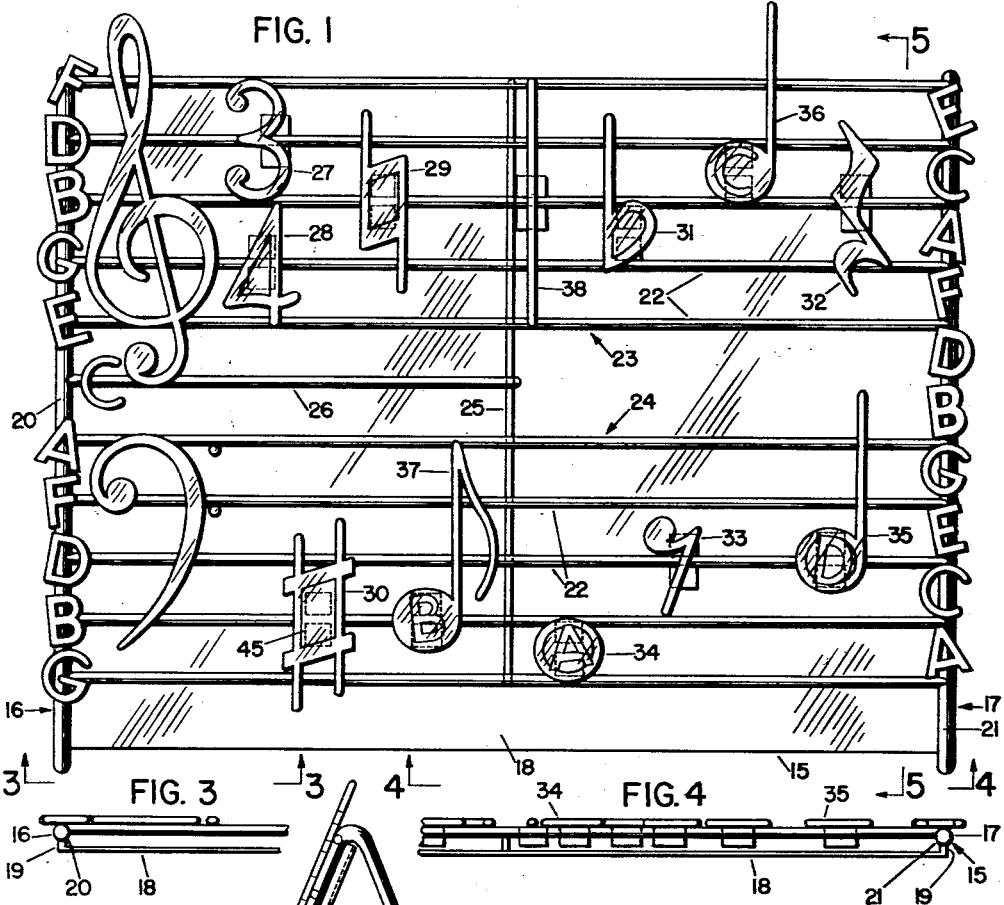
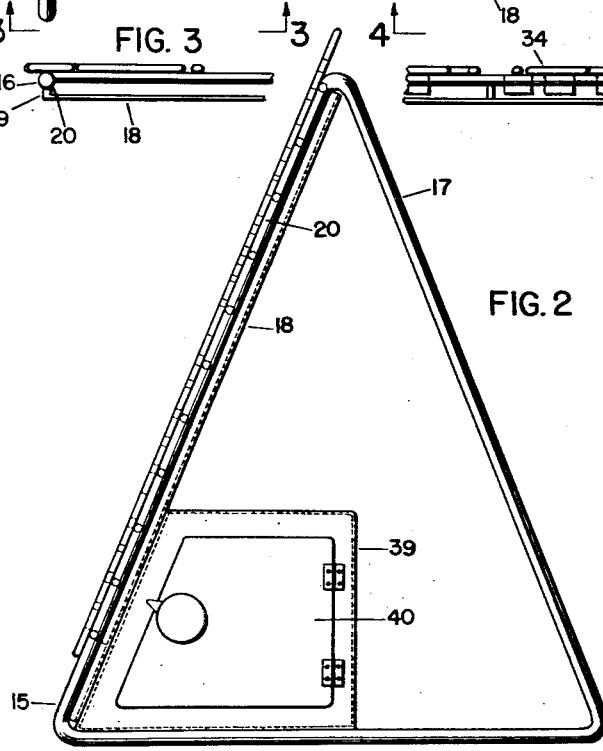
INVENTOR.
Loetta E. Cutlip
BY
William Cleland
Attorney Dec. 4, 1956  L. E. CUTLIP  2,772,595
GAME FOR TEACHING WRITTEN MUSIC
Filed May 21, 1953  2 Sheets-Sheet 2
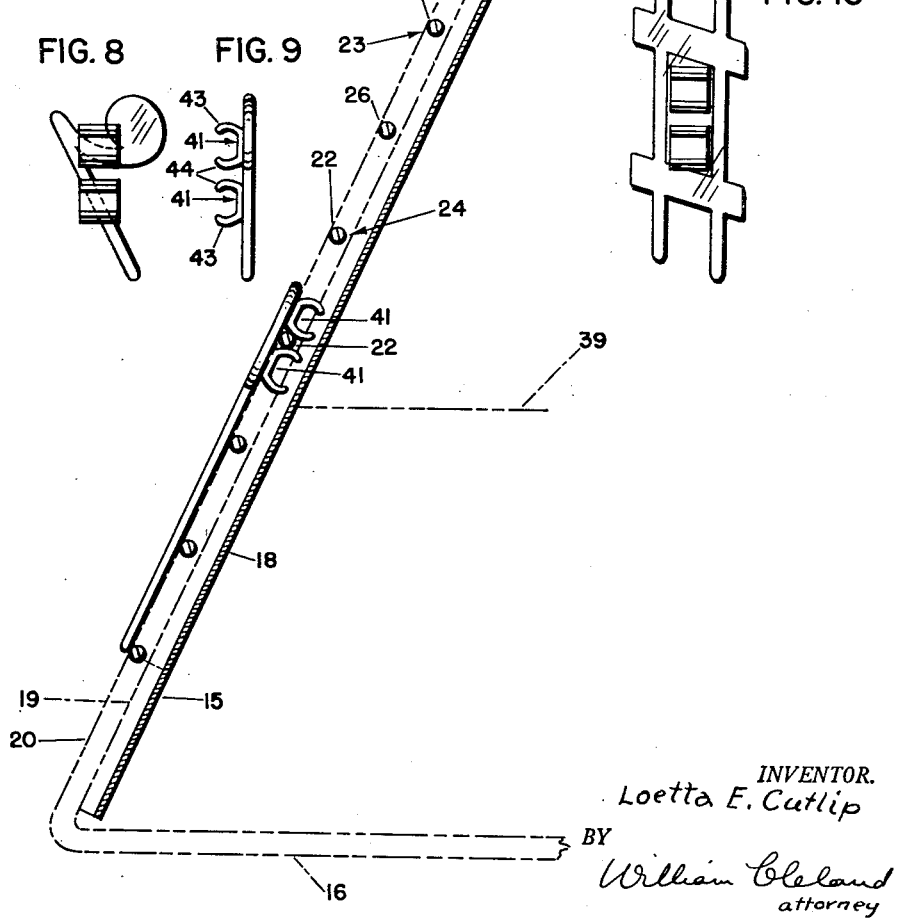
INVENTOR.
Loetta E. Cutlip
BY
William Cleland
attorney

United States Patent Office 2,772,595
Patented Dec. 4, 1956

2,772,595
GAME FOR TEACHING WRITTEN MUSIC
Loetta E. Cutlip, Akron, Ohio
Application May 21, 1953, Serial No. 356,341
3 Claims. (Cl. 84—472)

This invention relates to a game for teaching written music.

One object of the invention is to provide a device of the character described which by reason of its simplicity of operation and fascinating construction is particularly useful for teaching children the fundamentals of music.

Other objects of the invention will be manifest from the following brief description and the accompanying drawings.

Of the accompanying drawings:

Figure 1 is a front elevation of a device embodying the features of the invention.

Figure 2 is an end elevation of the same as viewed from the right of Figure 1.

Figure 3 is a fragmentary bottom edge view of the device as viewed substantially on the line 3—3 of Figure 1.

Figure 4 is a view similar to Figure 3, as viewed substantially on the line 4—4 of Figure 1.

Figure 5 is an enlarged cross-section, partly broken away and in section, taken substantially on the line 5—5 of Figure 1.

Figure 6 is a rear elevation of a detachable note element utilized with the device shown in Figures 1 to 5.

Figure 7 is an edge view of the note element shown in Figure 6, as viewed from the right thereof.

Figure 8 is a rear elevation of a detachable element representing a rest symbol.

Figure 9 is an edge view of the rest element shown in Figure 8, as viewed from the right thereof.

Figure 10 is a rear elevation of a detachable element representing a symbol of a sharp.

Referring to the drawings generally, the numeral 15 designates a self-supporting frame having aligned triangular ends 16 and 17 formed, for example, of cylindrical synthetic resin plastic material, and held laterally spaced in parallelism, as by a backing plate 18 of similar material having oppositely outturned ends or flanges 19, 19 cemented or otherwise bonded to the rear portions of forwardly presented side rails 20 and 21 of the triangular ends. Similarly bonded to the side rails to extend laterally between the same in parallelism, may be a plurality of transversely spaced bars 22, 22 of synthetic resin plastic material of round cross-section. These bars are equally spaced in two series of five thereof to represent the treble and bass clef lines of the grand staff, the treble and bass staffs being indicated by the numerals 23 and 24, respectively. For providing backing support for the staff line bars 22, a thin bar or spacer 25 may be positioned between the same and backing plate 18, at a point centrally of the side rails 20 and 21.

Cut-out letters of colorful synthetic resin material may be bonded to the left-hand side rail 20 to designate the names of the treble clef staff lines E, G, B, D and F, and the bass clef staff lines G, B, D, F, and A, as best shown in Figure 1. Similar letters may be bonded to the right-hand side rail 21 to designate the names F, A, C and E of the spaces between the treble clef staff lines, and the names A, C, E, and G between the bass clef staff lines. Attached between the spacer 25 and the left-hand side rail 20, equi-distant from clef staff line E and bass clef line A, may be a round bar 26, representing middle C of the grand staff, also designated by a cut-out type letter C. Correspondingly, the spacers immediately below and above the middle C line are designated by their respective letters B and D, attached to the right-hand rail 21. The upper and lower staffs 23 and 24 may be indicated by treble and bass clef signs, respectively, affixed across the staff lines, as best shown in Figure 1.

For use with the device described above there may be provided a plurality of separate detachable elements of various shapes or configurations, representing notes, signs, and symbols of written music, such as time signature numerals 27 and 28, natural 29, sharp 30, flat 31, quarter rest 32, eighth rest 33, whole note 34, half note 35, quarter note 36, eighth note 37, and a measure dividing bar 38. These various elements, together with others for the same or different notes and symbols, may when not in use be stored in a plastic walled storage receptacle 39 attached to the frame, as shown in Figure 2, the receptacle having an access door 40 at one end thereof.

For removably attaching the elements to the staff line bars 22, each element may have integrally formed or bonded on the back thereof a pair of U-shaped or two-pronged members 41, 41 of resilient plastic material or metal, providing two outwardly oppositely arcuate tangs 43, 43 yieldingly engageable between two adjacent staff line bars 22 to center the respective element between the same, as shown at the top of Figure 5, and two inwardly oppositely arcuate tangs 44, 44 intermediate the tangs 43, adapted to embrace a single staff line bar 22 to center the respective element over the staff line (see also Figures 6 to 10). Where necessary the elements may be suitably marked or etched on solid portions thereof to complete the outline of notes or symbols, as indicated at 45 on element 30 in Figure 1, for example. If desired the notes may be designated by letters corresponding to the letter names of various staff lines, to be applied to the staff line bars in accordance with given instructions or rules for use of the device. The device may be made very attractive by making the various parts or elements of contrastingly colored synthetic resin plastics.

In use of the apparatus described above a child may follow a given set of music lesson instructions or rules of a game, and releasably center the various elements either between the staff line bars 22, as shown at the top of Figure 5, or center the same directly over a single staff line bar 22, as shown at the bottom of said Figure 5. The arcuate shape of the prongs 43, 43 and 44, 44 provides sufficiently undercut portions for retaining the round cross-section of the staff line bars behind the same. Thus the child, by manual placement of the elements, as described, will quickly learn the fundamentals of music in a manner which is conducive to permanent retention of the same in the mind.

Modifications of the invention may be resorted to without departing from the spirit thereof or the scope of the appended claims.

What is claimed is:

1. A device of the character described for teaching written music, comprising a frame, a plurality of laterally extending bars supported in parallelism on said frame, said bars being in series of the same transversely equally spaced to represent the clef staff lines and separate elements representing notes and symbols of written music, attaching means on the back of each said element for selectively releasably attaching the same in various positions on the staff line bars, said attaching means of each said element including two resiliently mounted, outwardly oppositely arcuate tangs defining outwardly oppositely presented undercut portions, said outwardly arcuate tangs being yieldingly inwardly engageable between two adjacent staff line bars yieldingly to retain the same behind said undercut portions for centering the element between said two adjacent staff line bars, and two inwardly arcuate tangs resiliently mounted intermediate said outwardly opposite arcuate tangs and defining outwardly oppositely presented undercut portions adapted similarly to receive and yieldingly retain a single staff line bar behind the same for centering the element over the last-named line bar.

2. A device of the character described for teaching written music, comprising a frame, a plurality of laterally extending bars supported in parallelism on said frame, said bars being in series of the same transversely equally spaced to represent the clef staff lines and separate elements representing notes and symbols of written music, attaching means on the back of each said element for selectively releasably attaching the same in various positions on the staff line bars, said attaching means of each said element including two resiliently mounted, outwardly oppositely arcuate tangs defining outwardly oppositely presented undercut portions, said outwardly arcuate tangs being yieldingly inwardly engageable between two adjacent staff line bars yieldingly to retain the same behind said undercut portions for centering the element between said two adjacent staff line bars, and two inwardly arcuate tangs resiliently mounted intermediate said outwardly opposite arcuate tangs and defining outwardly oppositely presented undercut portions adapted similarly to receive and yieldingly retain a single staff line bar behind the same for centering the element over the last-named line bar, series of letters being affixed to opposite ends of the frame to designate the names of said staff lines and the spaces therebetween, respectively, a backing of sheet material being supported on said frame to be spaced rearwardly of said staff line bars to have substantial lengths of said bars free and unobstructed completely around the same.

3. A device of the character described for teaching written music, comprising a frame, a plurality of laterally extending bars supported in parallelism on said frame, said bars being in series of the same transversely equally spaced to represent the clef staff lines and separate elements representing notes and symbols of written music, attaching means on the back of each said element for selectively releasably attaching the same in various positions on the staff line bars, said attaching means of each said element including two resiliently mounted, outwardly oppositely arcuate tangs defining outwardly oppositely presented undercut portions, said outwardly arcuate tangs being yieldingly inwardly engageable between two adjacent staff line bars yieldingly to retain the same behind said undercut portions for centering the element between said two adjacent staff line bars, and two inwardly arcuate tangs resiliently mounted intermediate said outwardly opposite arcuate tangs and defining outwardly oppositely presented undercut portions adapted similarly to receive and yieldingly retain a single staff line bar behind the same for centering the element over the last-named line bar, series of letters being affixed to opposite ends of the frame to designate the names of said staff lines and the spaces therebetween, respectively.

References Cited in the file of this patent

UNITED STATES PATENTS

| | | |
|---|---|---|
| 510,302 | Thew | Dec. 4, 1893 |
| 1,754,459 | Cash | Apr. 15, 1930 |
| 1,945,398 | Gregg | Jan. 30, 1934 |
| 2,072,511 | Ross | Mar. 2, 1937 |
| 2,092,508 | Hammar | Sept. 7, 1937 |